(12) United States Patent
Huang et al.

(10) Patent No.: US 10,607,106 B2
(45) Date of Patent: Mar. 31, 2020

(54) OBJECT SYMMETRY AXIS DETECTION METHOD BASED ON RGB-D CAMERA

(71) Applicant: Jiangnan University, Wuxi (CN)

(72) Inventors: Min Huang, Wuxi (CN); Hao Li, Wuxi (CN); Qibing Zhu, Wuxi (CN); Ya Guo, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 16/093,658

(22) PCT Filed: Apr. 17, 2018

(86) PCT No.: PCT/CN2018/083260
§ 371 (c)(1),
(2) Date: Oct. 15, 2018

(87) PCT Pub. No.: WO2019/100647
PCT Pub. Date: May 31, 2019

(65) Prior Publication Data
US 2019/0362178 A1 Nov. 28, 2019

(30) Foreign Application Priority Data
Nov. 21, 2017 (CN) .......................... 2017 1 1165747

(51) Int. Cl.
*G06T 7/00* (2017.01)
*G06T 7/68* (2017.01)
(Continued)

(52) U.S. Cl.
CPC ............. *G06K 9/52* (2013.01); *G06K 9/6276* (2013.01); *G06T 7/136* (2017.01); *G06T 7/68* (2017.01);
(Continued)

(58) Field of Classification Search
CPC .......... G06K 9/52; G06K 9/6276; G06T 7/80; G06T 7/136; G06T 7/68;
(Continued)

(56) References Cited

U.S. PATENT DOCUMENTS

2008/0247660 A1 10/2008 Zhang et al.
2017/0094262 A1* 3/2017 Peterson ............... H04N 21/854

FOREIGN PATENT DOCUMENTS

CN 104126989 A 11/2014
CN 104298971 A 1/2015
(Continued)

*Primary Examiner* — Kenny A Cese
(74) *Attorney, Agent, or Firm* — Bayramoglu Law Offices LLC

(57) ABSTRACT

An object symmetry axis detection method based on an RGB-D camera includes: obtaining three-dimensional point cloud data of an image of a target object in natural scenes, identifying data corresponding to a point cloud of an area where the target object is located from the three-dimensional point cloud data according to a color difference threshold segmentation method, establishing a spherical coordinate system centering about a centroid of the target point cloud data, selecting $n^2$ candidate symmetry planes with a spherical coordinate system segmentation method, and calculating a symmetry axis of the target point cloud data according to the $n^2$ candidate symmetry planes as the symmetry axis of the target object.

20 Claims, 4 Drawing Sheets

(51) Int. Cl.
  *G06T 7/80*  (2017.01)
  *G06K 9/52*  (2006.01)
  *G06T 7/136* (2017.01)
  *G06T 15/00* (2011.01)
  *G06K 9/62*  (2006.01)

(52) U.S. Cl.
  CPC ...... *G06T 7/80* (2017.01); *G06T 2207/10024* (2013.01); *G06T 2207/10028* (2013.01)

(58) Field of Classification Search
  CPC . G06T 2207/10024; G06T 2207/10028; G06T 17/00; G06T 15/00
  See application file for complete search history.

(56) References Cited

FOREIGN PATENT DOCUMENTS

| | | |
|---|---|---|
| CN | 105184830 A | 12/2015 |
| CN | 106780528 A | 5/2017 |

* cited by examiner

OBJECT SYMMETRY AXIS DETECTION METHOD BASED ON RGB-D CAMERA

CROSS REFERENCE TO RELATED APPLICATIONS

This application is the national phase entry of International Application No. PCT/CN2018/083260, filed on Apr. 17, 2018, which is based upon and claims priority to Chinese Patent Application No. CN2017111657472, filed on Nov. 21, 2017, the entire contents of which are incorporated herein by reference.

TECHNICAL FIELD

The present invention relates to the field of image processing, and more particularly to an object symmetry axis detection method based on an RGB-D camera.

BACKGROUND

A fruit picking robot can automatically detect and pick fruits, and is widely used due to the advantages of high efficiency and high degree of automation. The picking action of the fruit picking robot depends on accurate detection and positioning of the fruit by the vision detection system of the fruit picking robot. The literature indicates that, the picking efficiency of the fruit can be improved by rotating and twisting the fruit in a specific manner with respect to the directions of the fruit and the stem. Therefore, in order to further improve the picking efficiency, it is necessary to improve the detection accuracy of the fruit picking robot on the fruit symmetry axis.

Currently, the common fruit symmetry axis detection methods include: a symmetry axis seeking method based on curvature change of a curved surface, a learning-based natural image detection method, a natural image symmetry axis detection method based on edge feature learning, and the like. However, many problems still exist, for example, the adopted three-dimensional point clouds need to be quite accurate, and the learning time becomes very long along with the increase of point cloud data, and it is not convenient to detect the fruit symmetry axis from images taken in natural scenes.

SUMMARY

In view of the above problems and technical requirements, the present inventor proposes an object symmetry axis detection method based on an RGB-D camera, which can accurately detect the symmetry axis of an object in a natural scene.

The technical solutions of the present invention are described as follows:

An object symmetry axis detection method based on an RGB-D camera, including:

calibrating a color camera and a depth camera of the RGB-D camera, to obtain camera parameters of the RGB-D camera;

obtaining a color image of a target object with the color camera of the RGB-D camera and a depth image of the target object with the depth camera of the RGB-D camera;

mapping the depth image into a color image pixel coordinate system where the color image is located according to camera parameters of the RGB-D camera, to obtain an aligned depth image, and processing the color image and the aligned depth image into three-dimensional point cloud data, wherein the three-dimensional point cloud data includes three-dimensional coordinates and color information of a point cloud;

identifying target point cloud data from the three-dimensional point cloud data according to a color difference threshold segmentation method, wherein the target point cloud data is data corresponding to a point cloud of an area where the target object is located;

seeking a centroid of the target point cloud data, establishing a spherical coordinate system centering about the centroid, and selecting $n^2$ candidate symmetry planes with a spherical coordinate system segmentation method, wherein n is an integer of greater than 3;

calculating a symmetry axis of the target point cloud data according to the $n^2$ candidate symmetry planes, and determining the symmetry axis of the target point cloud data is a symmetry axis of the target object.

Furthermore, the technical solution of calculating the symmetry axis of the target point cloud data according to the $n^2$ candidate symmetry planes, includes:

calculating a score of each candidate symmetry plane in the $n^2$ candidate symmetry planes according to a preset scoring strategy;

determining the candidate symmetry plane with the lowest score is a symmetry plane of the target object;

calculating the symmetry axis of the target point cloud data according to the symmetry plane of the target object.

Furthermore, the technical solution of calculating the symmetry axis of the target point cloud data according to the symmetry plane of the target object, includes calculating:

$$\vec{l} = \vec{n_p} \times \frac{p_v - p_o}{\|p_v - p_o\|}$$

wherein, $\vec{l}$ is a symmetry axis vector of the target point cloud data, $\vec{n_p}$ is a normal vector of the symmetry plane of the target object, $p_v$ is coordinates of a viewpoint, $p_o$ is coordinates of the centroid of the target point cloud data.

Furthermore, the technical solution of calculating the score of each candidate symmetry plane in the $n^2$ candidate symmetry planes according to the preset scoring strategy, includes:

determining a candidate point in the candidate symmetry plane for each candidate symmetry plane, wherein the candidate point is a point having a symmetric partner in the candidate symmetry plane;

calculating a score of each candidate point according to the preset scoring strategy;

determining a sum of the scores of all the candidate points to be the score of the candidate symmetry plane.

Furthermore, the technical solution of calculating the score of each candidate point according to the preset scoring strategy, includes:

calculating a symmetry point of the candidate point with respect to the candidate symmetry plane;

determining a neighbor point nearest to the symmetry point of the candidate point according to the KNN classification algorithm, and determining the distance between the symmetry point of the candidate point and the neighbor point;

calculating $x_{score} = d_{min} + \omega \cdot \alpha$, wherein, $x_{score}$ is the score of the candidate point, $d_{min}$ is the distance between the symmetry point of the candidate point and the neighbor point, $\alpha$ is an angle between a normal vector of the symmetry point of the candidate point and a normal vector of the neighbor point, ω is a weight coefficient.

Furthermore, the technical solution of determining the candidate point in the candidate symmetry plane, includes:

calculating $\widetilde{n_x} \cdot (p_v-p)$, $p_v$ is coordinates of a viewpoint, p is a point on one side of the candid symmetry plane, $\widetilde{n_x}$ is a normal vector at the point;

when $\widetilde{n_x} \cdot (p_v-p) > 0$, determining the point to have a symmetric partner in the candidate symmetry plane, and the point is a candidate point.

Furthermore, the technical solution of identifying target point cloud data from the three-dimensional point cloud data according to the color difference threshold segmentation method, includes:

identifying foreground point cloud data from the three-dimensional point cloud data according to the color difference threshold segmentation method;

calculating $$d_i = \sum_{j=1}^{k} \frac{1}{k} \sqrt{(x_i - x_j)^2 + (y_i - y_j)^2 + (z_i - z_j)^2}$$

for any point cloud of all the point clouds in the foreground point cloud data, $d_i$ is an average distance between the point cloud and all the neighbor points of the point cloud, k is the number of the neighbor points of the point cloud, $(x_i, y_i, z_i)$ are coordinates of the point cloud, $(x_j, y_j, z_j)$ are coordinates of the neighbor points of the point cloud;

detecting whether $d_i$ is in the range of $\mu \pm \gamma \sigma$, wherein, $$\mu = \sum_{i=1}^{m} \frac{d_i}{m}, \sigma = \sqrt{\frac{1}{m}\sum_{i=1}^{m}(d_i \cdot \mu)^2},$$

m is the number of point clouds in the foreground point cloud data, γ is a parameter;

if $d_i$ is in the range of $\mu \pm \gamma \sigma$, then determining the data corresponding to the point cloud is the target point cloud data.

Furthermore, the technical solution of identifying foreground point cloud data from the three-dimensional point cloud data according to the color difference threshold segmentation method, includes:

calculating $R_s - G_s$ for any point cloud of all the point clouds in the foreground point cloud data, $R_s$ is red-channel R information of the point cloud, $G_s$ is green-channel G information of the point cloud;

if $R_s - G_s > \delta$, then determining the data corresponding to the point cloud to be the foreground point cloud data, δ is a preset threshold.

Furthermore, the technical solution of establishing the spherical coordinate system centering about the centroid, and selecting $n^2$ candidate symmetry planes with the spherical coordinate system segmentation method, include:

establishing the spherical coordinate system centering about the centroid, determining ranges of a horizontal segmentation angle and a vertical segmentation angle;

equally dividing the horizontal segmentation angle by calculating $$thetaBinSize = \frac{(\theta(2) - \theta(1))}{n},$$

equally dividing the vertical segmentation angle by calculating $$phiBinSize = \frac{(\varphi(2) - \varphi(1))}{n},$$

wherein, thetaBinSize is a variation range of the horizontal segmentation angle, phiBinSize is a variation range of the vertical segmentation angle, θ(2) and θ(1) are the maximum value and the minimum value of the horizontal segmentation angle, respectively, φ(2) and φ(1) are the maximum value and the minimum value of the vertical segmentation angle, respectively;

changing the horizontal segmentation angle and the vertical segmentation angle for n times, respectively, to obtain $n^2$ sets of unit normal vectors of a segmentation plane;

obtaining $n^2$ candidate symmetry planes according to the $n^2$ sets of unit normal vectors of the segmentation plane.

Furthermore, the technical solution of seeking the centroid of the target point cloud data, includes:

randomly producing a predetermined number of random points near the target point cloud data, wherein the predetermined number is greater than the number of the target point cloud data;

for each random point, seeking a root-mean-square error of the distance between the random point and each point cloud in the target point cloud data;

determining a random point with the minimum root-mean-square error of the distance between the random point and each point cloud in the target point cloud data is the centroid of the target point cloud data.

The present invention has the following advantageous technical effects:

This application discloses an object symmetry axis detection method based on an RGB-D camera, which achieves three-dimensional reconstruction of the RGB-D image of a target object, achieves point cloud filtering, and finally achieves target object symmetry axis detection by adopting a scoring strategy. When the method is applied to the field of fruit picking, the fruit symmetry axis can be accurately sought based on fruit images taken in natural scenes, overcoming the defect that the previous fruit identification is only accurate to individuals, but cannot describe individual features, facilitating a manipulator to grasp, improving the automatic picking efficiency of fruits and reducing damage to fruits.

DETAILED DESCRIPTION

Specific embodiments of the present invention will be further illustrated below with reference to the accompanying drawings.

Figure 1:
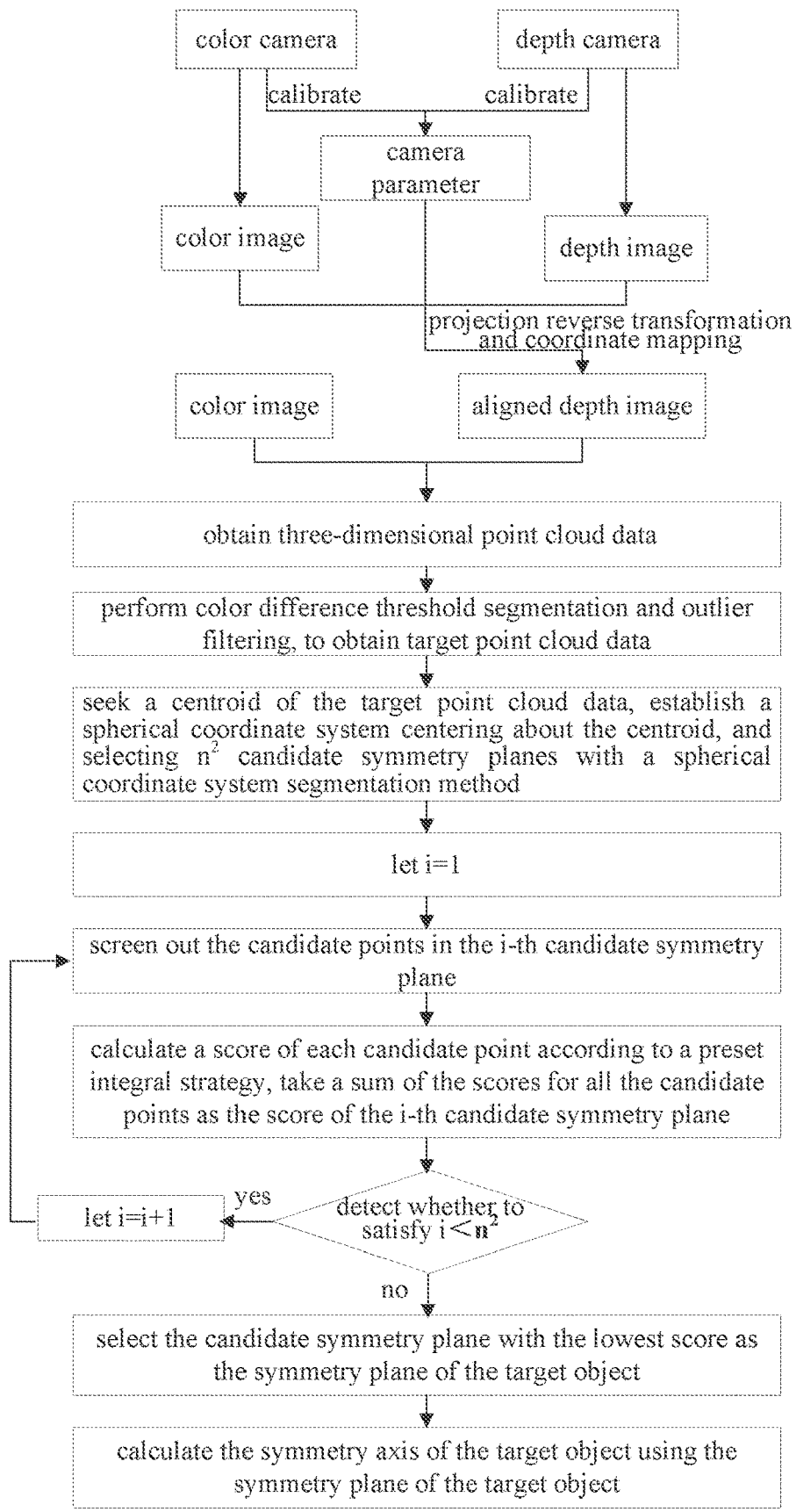
FIG. 1 is a method flowchart of an object symmetry axis detection method based on an RGB-D camera disclosed in the present invention.

This application discloses an object symmetry axis detection method based on an RGB-D camera, and the RGB-D camera includes a color camera and a depth camera. Referring to FIG. 1 for the main flowchart, the method includes the steps as follows:

One: the color camera and the depth camera of the RGB-D camera are calibrated respectively, to obtain camera parameters of the RGB-D camera. The camera parameters include parameters of the color camera and parameters of the depth camera. The Zhang Zhengyou calibration method is adopted in this application, in practice, other methods also can be adopted, and this application is not limited thereto. The parameters of the color camera obtained by calibrating the color camera of the RGB-D camera with the Zhang Zhengyou calibration method include: a color camera intrinsic parameter $H_{rgb}$ and a color camera extrinsic parameter $(R_{rgb}, T_{rgb})$; and the parameters of the depth camera obtained by calibrating the depth camera of the RGB-D camera with the Zhang Zhengyou calibration method include: a depth camera intrinsic parameter $H_d$ and a depth camera extrinsic parameter $(R_d, T_d)$.

Two: a color image of a target object is obtained with the color camera of the RGB-D camera and a depth image of the target object is obtained with the depth camera of the RGB-D camera. In this application, the target object is fruit in a fruit tree taken in natural scenes. The color image captured by the color camera has a higher resolution, usually 1080*1920, the depth image captured by the depth camera has a lower resolution, usually 424*512, the specific resolutions of the color image and the depth image are determined by factors such as hardware parameters of the RGB-D camera and human setting, and this application is not limited thereto.

In practical implementation, step one and step two described above have no specific sequential orders.

Figure 2:
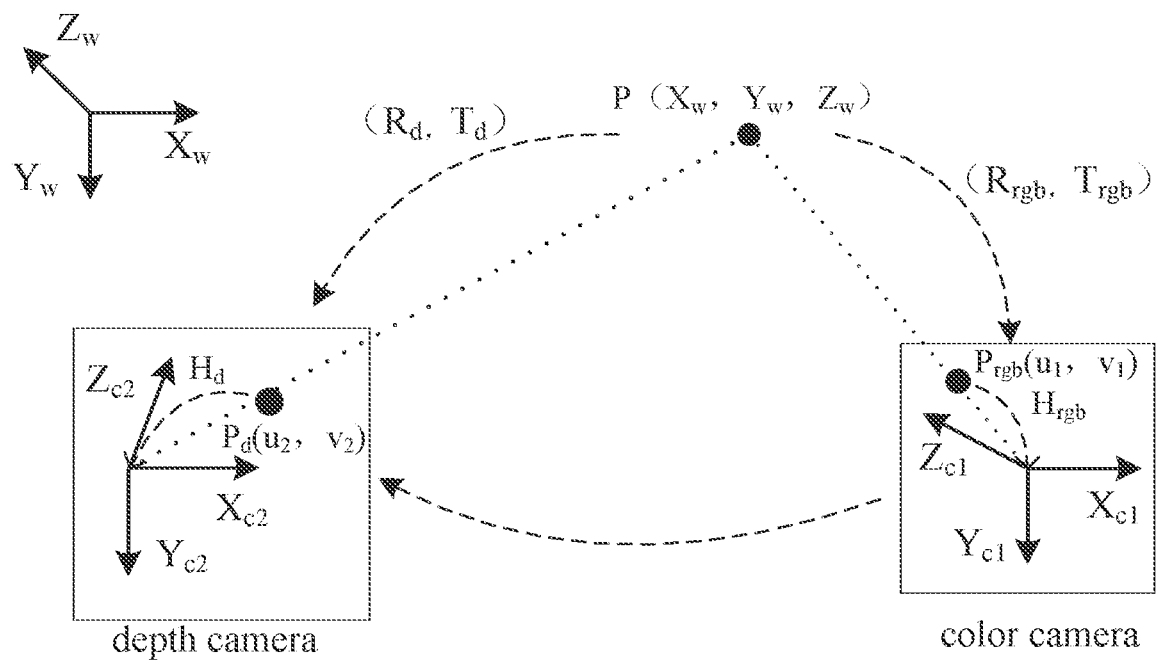
FIG. 2 is a schematic diagram of a coordinate mapping model between a color camera and a depth camera.

Three: the depth information is mapped into a color image pixel coordinate system using camera parameters of the RGB-D camera, according to the coordinate mapping relationship between the projection reverse transformation and the spatial coordinate system, to obtain an aligned depth image in one-to-one correspondence with pixel points of the color image. The aligned depth image and the color image have the same resolution, which is 1080*1920. The schematic diagram is as shown in FIG. 2, and in particular, the following steps are included:

Step 1: projection coordinates $P_{rgb}(X_{c1},Y_{c1},Z_{c1})$ of the color camera in the world coordinate system $P(X_w,Y_w,Z_w)$ are obtained using extrinsic parameters of the color camera, according to the projection reverse transformation, and projection coordinates $P_d(X_{c2},Y_{c2},Z_{c2})$ of the depth camera in the world coordinate system $P(X_w,Y_w,Z_w)$ are obtained using extrinsic parameters of the depth camera, according to the projection reverse transformation.

Step 2: coordinates $P_{rgb}(u_1, v_1)$ of image pixels in the color camera coordinate system are obtained using intrinsic parameters of the color camera, coordinates $P_d(u_2, v_2)$ of image pixels in the depth camera coordinate system are obtained using intrinsic parameters of the depth camera.

Step 3: the corresponding relation between the color image pixel coordinates and the depth image pixel coordinates is determined according to projection coordinates $P_{rgb}(X_{c1},Y_{c1},Z_{c1})$ of the color camera in the world coordinate system, projection coordinates $P_d(X_{c2},Y_{c2},Z_{c2})$ of the depth camera in the world coordinate system, coordinates $P_{rgb}(u_1,v_1)$ of image pixels in the color camera coordinate system, coordinates $P_d(u_2,v_2)$ of image pixels in the depth camera coordinate system.

Step 4: finally, the depth image is mapped into the color image pixel coordinate system, according to the corresponding relation between the color image pixel coordinates and the depth image pixel coordinates, to obtain an aligned depth image.

Four: the color image and the aligned depth image are processed into three-dimensional point cloud data, the three-dimensional point cloud data includes three-dimensional coordinates and color information of a point cloud, represented by s=(x,y,z,R,G,B); where, x, y, z are coordinates of the point cloud corresponding to spatial X-axis, Y-axis and Z-axis, respectively; R is red-channel information of the point cloud, G is green-channel information of the point cloud, B is blue-channel information of the point cloud.

Five: foreground point cloud data is identified from the three-dimensional point cloud data according to a color difference threshold segmentation method, in particular, $R_s-G_s$ is calculated for any point cloud in the three-dimensional point cloud data, to separate the foreground from the background. $R_s$ is R information (red-channel information) of the point cloud, $G_s$ is G information (green-channel information) of the point cloud, if $R_s-G_s>\delta$, then the data corresponding to the point cloud is determined to be the foreground point cloud data, if $R_s-G_s \leq \delta$, then the data corresponding to the point cloud is determined to be the background point cloud data, $\delta$ is a preset threshold, usually an empirical value, such as $\delta=13$.

Six, in the foreground point cloud data obtained after color difference threshold segmentation, in addition to the point cloud of the area where the target object is located, some outlier noise points farther away from the target object are also included, and these noises are filtered out with an outlier filtering method, in particular, for any point cloud in the foreground point cloud data, $p_i$, calculating:

$$d_i = \sum_{j=1}^{k} \frac{1}{k}\sqrt{(x_i-x_j)^2 + (y_i-y_j)^2 + (z_i-z_j)^2},$$

$$\mu = \sum_{i=1}^{m} \frac{d_i}{m},$$

$$\sigma = \sqrt{\frac{1}{m}\sum_{i=1}^{m}(d_i-\mu)^2},$$

wherein, $d_i$ is an average distance between the point cloud $p_i$ and all the neighbor points $p_j$ of the point cloud in the space, $(x_i, y_i, z_i)$ are three-dimensional coordinates of the point cloud $p_i$, $(x_j, y_j, z_j)$ are three-dimensional coordinates of the neighbor points $p_j$ of the point cloud $p_i$; m is the number of point clouds in the foreground point cloud data, k is the searched number of the neighbor points of the point cloud $p_i$, k is a preset value; $\mu$ is an average value of the distances $d_i$ corresponding to various point clouds, $\sigma$ is a root-mean-square error of the distances $d_i$ corresponding to various point clouds.

whether $d_i$ is in the range of $\mu \pm \gamma\sigma$ is detected, $\gamma$ is a parameter; the value of the parameter $\gamma$ is related to the size of the number of the neighbor points, k, in general, the value of k is empirically set to 80 to 100, then the corresponding value of $\gamma$ is 0.8 to 1.2. If $d_i$ is in the range of $\mu \pm \gamma\sigma$, then the data corresponding to the point cloud is determined to be the target point cloud data, that is, the data corresponding to the point cloud of the area where the target object is located. If $d_i$ is not in the range of $\mu\pm\gamma\sigma$, then the point cloud is determined to be an outlier noise point farther away from the target object, and the point cloud is filtered out.

Seven: a centroid $P_0$ of the target point cloud data is sought, that is, a predetermined number of random points near the target point cloud data are randomly produced, and the predetermined number is greater than the number of the target point cloud data, in general, the predetermined number is 2 to 3 times the number of the target point cloud data. All the random points are traversed, for each random point, a Euclidean distance between the random point and each point cloud in the target point cloud data is sought, the random point with minimum distance fluctuation is determined to be the centroid $P_0$, that is, a root-mean-square error of the distance between the random point and each point cloud in the target point cloud data is sought, and the random point with the minimum root-mean-square error of the distance between the random point and each point cloud in the target point cloud data is determined to be the centroid $P_0$ of the target point cloud data.

Eight: referring to FIGS. 4-7, a spherical coordinate system centering about the centroid $P_0$ is established, and $n^2$ candidate symmetry planes are selected with a spherical coordinate system segmentation method, wherein n is an integer of greater than 3, and the following steps are included:

Step 1: ranges of a horizontal segmentation angle θ and a vertical segmentation angle φ are determined, the range of the horizontal segmentation angle θ is the whole range, i.e., θ∈[0, π], while φ only covers the negative half axis of the Z-axis, i.e.

$$\varphi \in \left[-\frac{\pi}{2}, \frac{\pi}{2}\right].$$

Step 2: the horizontal segmentation angle θ and the vertical segmentation angle φ are equally divided, by calculating:

$$thetaBinSize = \frac{(\theta(2) - \theta(1))}{n},$$
$$phiBinSize = \frac{(\varphi(2) - \varphi(1))}{n},$$

wherein, thetaBinSize is a variation range of the horizontal segmentation angle θ, phiBinSize is a variation range of the vertical segmentation angle φ, θ(2) and θ(1) are the maximum value and the minimum value of the horizontal segmentation angle, respectively, φ(2) and φ(1) are the maximum value and the minimum value of the vertical segmentation angle, respectively.

Step 3: the horizontal segmentation angle and the vertical segmentation angle are changed for n times, respectively, to obtain $n^2$ sets of unit normal vectors of a segmentation plane. Specifically, the horizontal segmentation angle θ is kept unchanged, the unit normal vector of the segmentation plane is calculated by changing the vertical segmentation angle φ, and n unit normal vectors are calculated by circularly changing the vertical segmentation angle φ for n times; the horizontal segmentation angle θ is circularly changed for n times, for each horizontal segmentation angle θ, $n^2$ sets of unit normal vectors of the segmentation plane are obtained by circularly changing the vertical segmentation angle φ, that is, $n^2$ candidate symmetry planes are obtained, and each unit normal vector is calculated by the following method:

$$x = r * \sin(theta) * \cos(phi);$$
$$y = r * \sin(theta) * \sin(phi);$$
$$z = r * \cos(theta);$$
$$theta = (i-1) * thetaBinSize + \frac{thetaBinSize}{2} + \theta(1);$$
$$phi = (j-1) * phiBinSize + \frac{phiBinSize}{2} + \varphi(1);$$

wherein, x, y and z are the calculated coordinate values of unit normal vectors, theta is an azimuth angle in the spherical coordinate system, phi is an elevation angle in the spherical coordinate system, r is a radius of a unit circle, i and j are parameters, particularly, i is the number of cyclic changes of the horizontal segmentation angle θ;j is the number of cyclic changes of the vertical segmentation angle φ.

Nine: a score of each candidate symmetry plane in the $n^2$ candidate symmetry planes is calculated according to a preset scoring strategy, all the candidate symmetry planes are traversed, and the candidate symmetry plane with the lowest score is determined to be a symmetry plane of the target object. Taking score calculation of one candidate symmetry plane for example, the calculation process includes the following steps:

Step 1: the candidate point in the candidate symmetry plane is first determined: $\widetilde{n}_x(p_v-p)$ is calculated, $p_v$ is coordinates of a viewpoint, the default is (0,0,0), p is a point on one side of the candidate symmetry plane, $\widetilde{n}_x$ is a normal vector at the point. When $\widetilde{n}_x(p_v-p)>0$, the point is determined to have a symmetric partner in the candidate symmetry plane, and the point is a candidate point. When $\widetilde{n}_x(p_v-p)\leq 0$, the point is determined to have no symmetric partner in the candidate symmetry plane, and all the candidate points in the candidate symmetry plane are screened out with this method.

The determination method of the normal vector at each point p is to: obtain t neighbor points nearest to the point p based on a local surface fitting method, t is an integer, and then a local plane P in a least squares sense is calculated for these points, and the local plane P can be expressed as:

$$P(\vec{n}, d) = \mathrm{argmin}\, \Sigma_{i=1}^{t}(\vec{n} \cdot \vec{p}_1 - w)^2;$$

wherein, $\vec{n}$ is a normal vector the local plane P, w is the distance from the local plane P to the origin of coordinates, $\vec{p}_l$ indicates a normal vector at point p. Due to the fact that the local plane P is fitted to the centroid $\bar{p}$ of the curved surface through t neighbor points, and the normal vector $\vec{n}$ needs to satisfy $\|\vec{n}\|_2=1$, so that the problem can be converted into the following eigenvalue decomposition on the positive semi-definite covariance matrix M:

$$M = \frac{1}{t}\sum_{i=1}^{t}(p_i - \bar{p})(p_i - \bar{p})^T;$$

The eigenvector corresponding to the least eigenvalue of the covariance matrix M is the normal vector at the point p.

Figure 3:
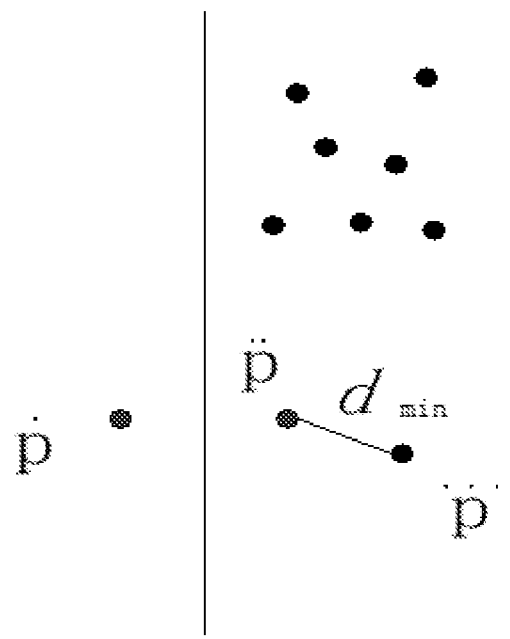
FIG. 3 is a schematic diagram of calculating a score of each candidate point according to a preset scoring strategy.
Figure 4:
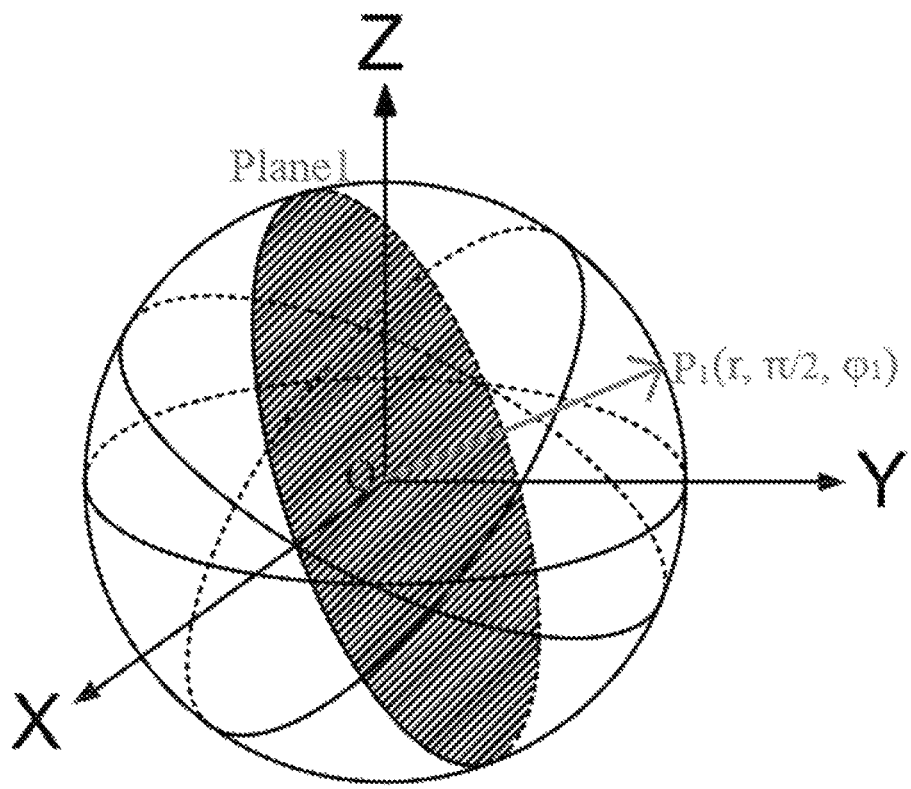
FIG. 4 is a schematic diagram showing a first candidate symmetry plane from a spherical coordinate system.
Figure 5:
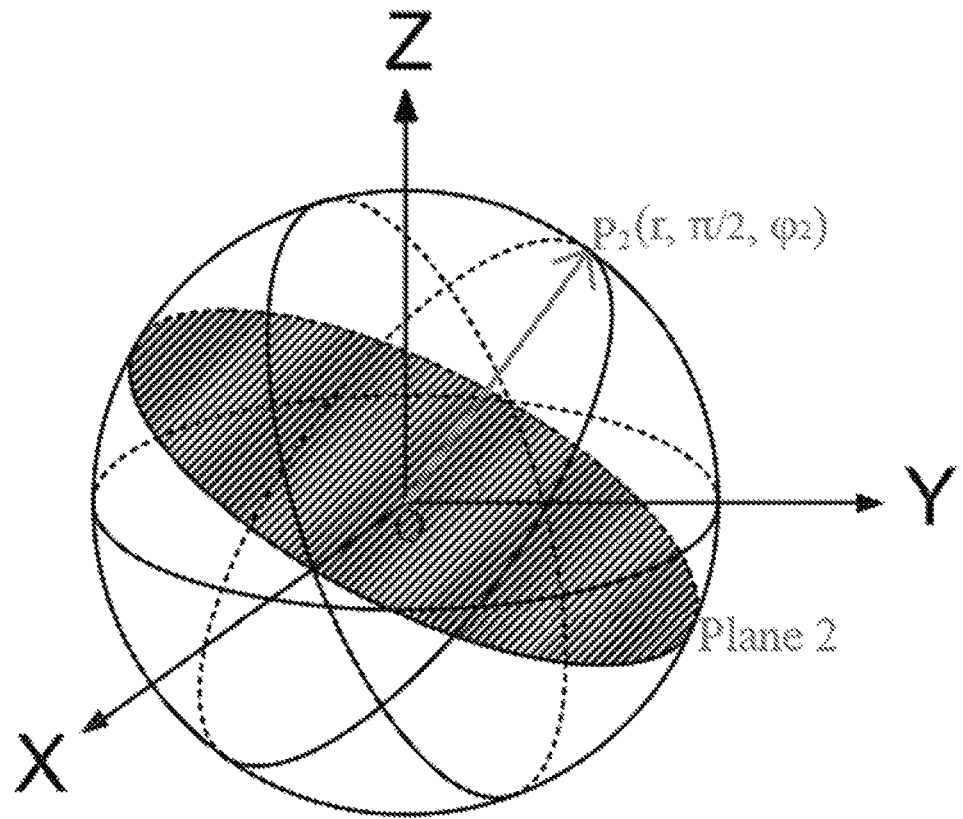
FIG. 5 is a schematic diagram showing a second candidate symmetry plane from the spherical coordinate system.
Figure 6:
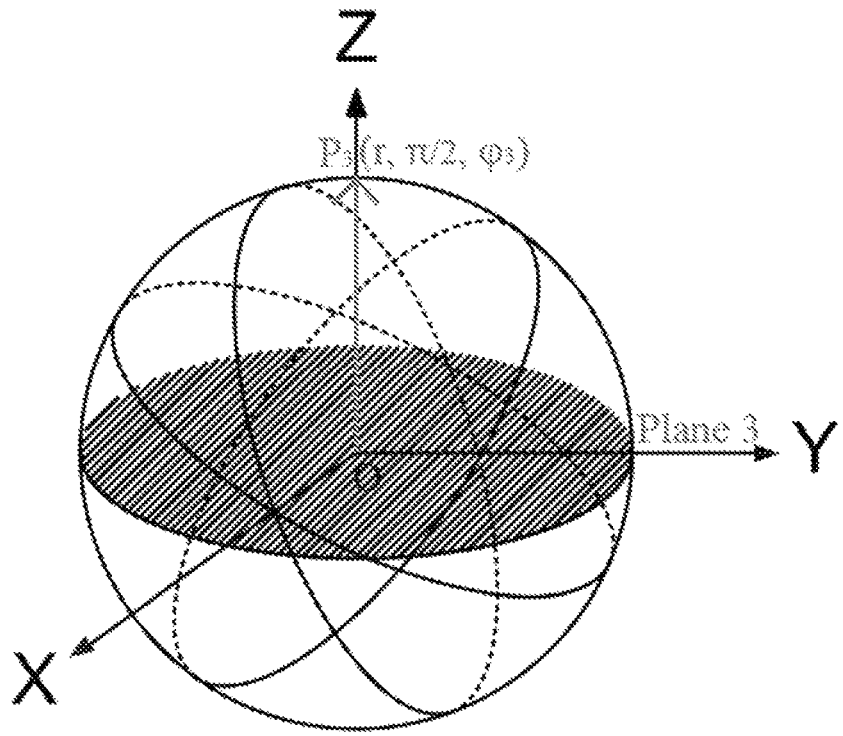
FIG. 6 is a schematic diagram showing a third candidate symmetry plane from the spherical coordinate system.
Figure 7:
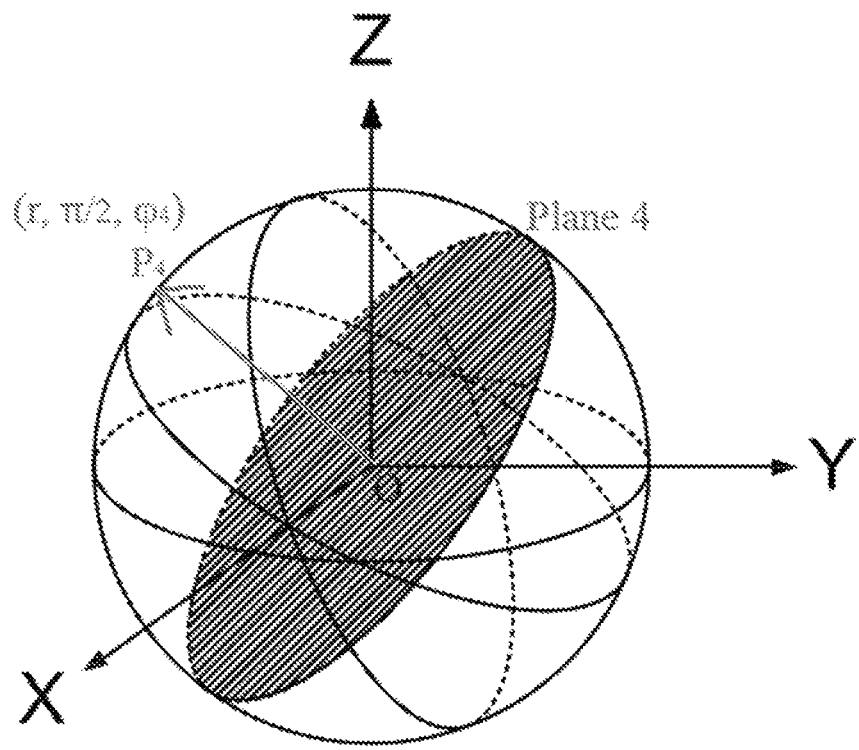
FIG. 7 is a schematic diagram showing a fourth candidate symmetry plane from the spherical coordinate system.

Step 2: the score of each candidate point is calculated according to the preset scoring strategy, particularly, a symmetry point $\ddot{P}$ of the candidate point $\dot{P}$ is calculated with respect to the candidate symmetry plane. A neighbor point $\ddot{P}'$ nearest to the symmetry point $\ddot{P}$ of the candidate point is determined according to the KNN (K-Nearest Neighbor) classification algorithm, and the distance $d_{min}$ between the symmetry point $\ddot{P}$ of the candidate point and the neighbor point $\ddot{P}'$ is determined, as shown in FIG. 3; $x_{score} = d_{min} + \omega \cdot \alpha$ is calculated, wherein, $x_{score}$ is the score of the candidate point, $\alpha$ is an angle between a normal vector of the symmetry point of the candidate point and a normal vector of the neighbor point, $\omega$ is a weight coefficient.

Step 3: a sum of the scores of all the candidate points is determined to be the score of the candidate symmetry plane.

Ten: the symmetry axis of the target point cloud data is calculated according to the symmetry plane of the target object, includes calculating:

$$\vec{l} = \vec{n_p} \times \frac{p_v - p_o}{\|p_v - p_o\|}$$

wherein, $\vec{l}$ is a symmetry axis vector of the target point cloud data, $\vec{n_p}$ is a normal vector of the symmetry plane of the target object, $p_v$ is coordinates of a viewpoint, the default is (0,0,0), $p_o$ is coordinates of the centroid of the target point cloud data, and the symmetry axis of the target point cloud data is a symmetry axis of the target object.

The embodiments described above are merely preferred embodiments of the present invention and do not limit the present invention. It can be understood that, any improvement and variation directly derived or conceived by persons skilled in the art without departing from the spirit and concept of the present invention, should be deemed to fall within the protection scope of the present invention.

What is claimed is:

1. An object symmetry axis detection method based on an RGB-D camera, comprising:
    calibrating a color camera of the RGB-D camera and a depth camera of the RGB-D camera to obtain camera parameters of the RGB-D camera;
    obtaining a color image of a target object with the color camera of the RGB-D camera and a depth image of the target object with the depth camera of the RGB-D camera;
    mapping the depth image into a color image pixel coordinate system according to the camera parameters of the RGB-D camera to obtain an aligned depth image, wherein the color image is located in the color image pixel coordinate system; and processing the color image and the aligned depth image into three-dimensional point cloud data, wherein the three-dimensional point cloud data comprises three-dimensional coordinates and color information of a point cloud;
    identifying target point cloud data from the three-dimensional point cloud data according to a color difference threshold segmentation method, wherein the target point cloud data is data corresponding to a first point cloud, the first point cloud is located in an area having the target object;
    seeking a centroid of the target point cloud data, establishing a spherical coordinate system centering about the centroid, and selecting $n^2$ candidate symmetry planes with a spherical coordinate system segmentation method, wherein n is an integer and n is greater than 3;
    calculating a symmetry axis of the target point cloud data according to the $n^2$ candidate symmetry planes, and determining the symmetry axis of the target point cloud data as a symmetry axis of the target object.

2. The method according to claim 1, wherein the step of calculating the symmetry axis of the target point cloud data according to the $n^2$ candidate symmetry planes comprises the following substeps:
    calculating a score of each candidate symmetry plane of the $n^2$ candidate symmetry planes according to a preset scoring strategy;
    determining a candidate symmetry plane with a lowest score as a symmetry plane of the target object;
    calculating the symmetry axis of the target point cloud data according to the symmetry plane of the target object.

3. The method according to claim 2, wherein the step of calculating the symmetry axis of the target point cloud data according to the symmetry plane of the target object comprises calculating:

$$\vec{l} = \vec{n_p} \times \frac{p_v - p_o}{\|p_v - p_o\|}$$

wherein $\vec{l}$ is a symmetry axis vector of the target point cloud data, $\vec{n_p}$ is a normal vector of the symmetry plane of the target object, $p_v$ is coordinates of a viewpoint, $p_o$ is coordinates of the centroid of the target point cloud data.

4. The method according to claim 2, wherein the step of calculating the score of each candidate symmetry plane of the $n^2$ candidate symmetry planes according to the preset scoring strategy comprises:
    determining a candidate point for the each candidate symmetry plane, wherein the candidate point is a point having a symmetric partner in the each candidate symmetry plane;
    calculating a score of each candidate point according to the preset scoring strategy;
    determining a sum of the scores of all the candidate points as the score of the each candidate symmetry plane.

5. The method according to claim 4, wherein, the step of calculating the score of each candidate point according to the preset scoring strategy, comprises:
    calculating a symmetry point of the each candidate point with respect to the each candidate symmetry plane;
    determining a neighbor point nearest to the symmetry point of the each candidate point according to a KNN classification algorithm, and determining a distance between the symmetry point of the each candidate point and the neighbor point;
    calculating $x_{score} = d_{min} + \omega \cdot \alpha$, wherein $x_{score}$ is the score of the each candidate point, $d_{min}$ is the distance between the symmetry point of the each candidate point and the neighbor point, $\alpha$ is an angle between a normal vector of the symmetry point of the each candidate point and a normal vector of the neighbor point, $\omega$ is a weight coefficient.

6. The method according to claim 4, wherein the step of determining the candidate point for the each candidate symmetry plane comprises:
calculating $\vec{n}_x \cdot (p_v - p)$, $p_v$ is coordinates of a viewpoint, p is a point on one side of the each candidate symmetry plane, $\vec{n}_x$ is a normal vector at the point;
when $\vec{n}_x \cdot (p_v - p) > 0$, determining the point to have a symmetric partner in the each candidate symmetry plane, the point is a candidate point.

7. The method according to claim 1, wherein the step of identifying target point cloud data from the three-dimensional point cloud data according to the color difference threshold segmentation method comprises:
identifying foreground point cloud data from the three-dimensional point cloud data according to the color difference threshold segmentation method;
calculating $$d_i = \sum_{j=1}^{k} \frac{1}{k} \sqrt{(x_i - x_j)^2 + (y_i - y_j)^2 + (z_i - z_j)^2}$$

for one point cloud of all the point clouds in the foreground point cloud data, $d_i$ is an average distance between the one point cloud and all neighbor points of the one point cloud, k is a number of the neighbor points of the one point cloud, $(x_i, y_i, z_i)$ are coordinates of the one point cloud, $(x_j, y_j, z_j)$ are coordinates of the neighbor points of the one point cloud;
detecting whether $d_i$ is in a range of $\mu \pm \gamma\sigma$, wherein $$\mu = \sum_{i=1}^{m} \frac{d_i}{m}, \sigma = \sqrt{\frac{1}{m}\sum_{i=1}^{m}(d_i \cdot \mu)^2},$$

m is a number of point clouds in the foreground point cloud data, $\gamma$ is a parameter;
if $d$ is in the range of $\mu \pm \gamma\sigma$, then determining data corresponding to the one point cloud as the target point cloud data.

8. The method according to claim 7, wherein the step of identifying foreground point cloud data from the three-dimensional point cloud data according to the color difference threshold segmentation method comprises:
calculating $R_s - G_s$ for the one point cloud of all the point clouds in the foreground point cloud data, $R_s$ is red-channel R information of the one point cloud, $G_s$ is green-channel G information of the one point cloud;
if $R_s - G_s > \delta$, then determining data corresponding to the one point cloud as the foreground point cloud data, $\delta$ is a preset threshold.

9. The method according to claim 1, wherein the step of establishing the spherical coordinate system centering about the centroid, and selecting $n^2$ candidate symmetry planes with the spherical coordinate system segmentation method comprise:
establishing the spherical coordinate system centering about the centroid, determining a range of a horizontal segmentation angle and a range of a vertical segmentation angle;
equally dividing the horizontal segmentation angle by calculating $$thetaBinSize = \frac{(\theta(2) - \theta(1))}{n},$$

equally dividing the vertical segmentation angle by calculating $$phiBinSize = \frac{(\varphi(2) - \varphi(1))}{n},$$

wherein thetaBinSize is a variation range of the horizontal segmentation angle, phiBinSize is a variation range of the vertical segmentation angle, $\theta(2)$ and $\theta(1)$ are a maximum value of the horizontal segmentation angle and a minimum value of the horizontal segmentation angle, respectively, $\varphi(2)$ and $\varphi(1)$ are a maximum value of the vertical segmentation angle and a minimum value of the vertical segmentation angle, respectively;
changing the horizontal segmentation angle and the vertical segmentation angle for n times, respectively, to obtain $n^2$ sets of unit normal vectors of a segmentation plane;
obtaining $n^2$ candidate symmetry planes according to the $n^2$ sets of unit normal vectors of the segmentation plane.

10. The method according to claim 1, wherein the step of seeking the centroid of the target point cloud data comprises:
randomly producing a predetermined number of random points near the target point cloud data, wherein the predetermined number is greater than a number of the target point cloud data;
for each random point, seeking a root-mean-square error of a distance between the each random point and each point cloud in the target point cloud data;
determining a random point with a minimum root-mean-square error of the distance between the each random point and each point cloud in the target point cloud data as the centroid of the target point cloud data.

11. The method according to claim 2, wherein the step of identifying target point cloud data from the three-dimensional point cloud data according to the color difference threshold segmentation method comprises:
identifying foreground point cloud data from the three-dimensional point cloud data according to the color difference threshold segmentation method;
calculating $$d_i = \sum_{j=1}^{k} \frac{1}{k}\sqrt{(x_i - x_j)^2 + (y_i - y_j)^2 + (z_i - z_j)^2}$$

for one point cloud of all the point clouds in the foreground point cloud data, $d_i$ is an average distance between the one point cloud and all neighbor points of the one point cloud, k is a number of the neighbor points of the one point cloud, $(x_i, y_i, z_i)$ are coordinates of the one point cloud, $(x_j, y_j, z_j)$ are coordinates of the neighbor points of the one point cloud;
detecting whether $d_i$ is in a range of $\mu \pm \gamma\sigma$, wherein $$\mu = \sum_{i=1}^{m}\frac{d_i}{m}, \sigma = \sqrt{\frac{1}{m}\sum_{i=1}^{m}(d_i \cdot \mu)^2},$$

m is a number of point clouds in the foreground point cloud data, $\gamma$ is a parameter;
if $d_i$ is in the range of $\mu \pm \gamma\sigma$, then determining data corresponding to the one point cloud as the target point cloud data.

12. The method according to claim 3, wherein the step of identifying target point cloud data from the three-dimensional point cloud data according to the color difference threshold segmentation method comprises:
    identifying foreground point cloud data from the three-dimensional point cloud data according to the color difference threshold segmentation method;
    calculating $$d_i = \sum_{j=1}^{k} \frac{1}{k} \sqrt{(x_i - x_j)^2 + (y_i - y_j)^2 + (z_i - z_j)^2}$$

for one point cloud of all the point clouds in the foreground point cloud data, $d_i$ is an average distance between the one point cloud and all neighbor points of the one point cloud, k is a number of the neighbor points of the one point cloud, $(x_i, y_i, z_i)$ are coordinates of the one point cloud, $(x_j, y_j, z_j)$ are coordinates of the neighbor points of the one point cloud;
    detecting whether $d_i$ is in a range of $\mu \pm \gamma \sigma$, wherein $$\mu = \sum_{i=1}^{m} \frac{d_i}{m}, \sigma = \sqrt{\frac{1}{m} \sum_{i=1}^{m} (d_i \cdot \mu)^2},$$

m is a number of point clouds in the foreground point cloud data, $\gamma$ is a parameter;
    if $d_i$ is in the range of II $\mu \pm \gamma \sigma$, then determining data corresponding to the one point cloud as the target point cloud data.

13. The method according to claim 4, wherein the step of identifying target point cloud data from the three-dimensional point cloud data according to the color difference threshold segmentation method comprises:
    identifying foreground point cloud data from the three-dimensional point cloud data according to the color difference threshold segmentation method;
    calculating $$d_i = \sum_{j=1}^{k} \frac{1}{k} \sqrt{(x_i - x_j)^2 + (y_i - y_j)^2 + (z_i - z_j)^2}$$

for one point cloud of all the point clouds in the foreground point cloud data, $d_i$ is an average distance between the one point cloud and all neighbor points of the one point cloud, k is a number of the neighbor points of the one point cloud, $(x_i, y_i, z_i)$ are coordinates of the one point cloud, $(x_j, y_j, z_j)$ are coordinates of the neighbor points of the one point cloud;
    detecting whether $d_i$ is in a range of $\mu \pm \gamma \sigma$, wherein $$\mu = \sum_{i=1}^{m} \frac{d_i}{m}, \sigma = \sqrt{\frac{1}{m} \sum_{i=1}^{m} (d_i \cdot \mu)^2},$$

m is a number of point clouds in the foreground point cloud data, $\gamma$ is a parameter;
    if $d_i$ is in the range of $\mu + \gamma \sigma$, then determining data corresponding to the one point cloud as the target point cloud data.

14. The method according to claim 5, wherein the step of identifying target point cloud data from the three-dimensional point cloud data according to the color difference threshold segmentation method comprises:
    identifying foreground point cloud data from the three-dimensional point cloud data according to the color difference threshold segmentation method;
    calculating $$d_i = \sum_{j=1}^{k} \frac{1}{k} \sqrt{(x_i - x_j)^2 + (y_i - y_j)^2 + (z_i - z_j)^2}$$

for one point cloud of all the point clouds in the foreground point cloud data, $d_i$ is an average distance between the one point cloud and all neighbor points of the one point cloud, k is a number of the neighbor points of the one point cloud, $(x_i, y_i, z_i)$ are coordinates of the one point cloud, $(x_j, y_j, z_j)$ are coordinates of the neighbor points of the one point cloud;
    detecting whether $d_i$ is in a range of $\mu \pm \gamma \sigma$, wherein $$\mu = \sum_{i=1}^{m} \frac{d_i}{m}, \sigma = \sqrt{\frac{1}{m} \sum_{i=1}^{m} (d_i \cdot \mu)^2},$$

m is a number of point clouds in the foreground point cloud data, $\gamma$ is a parameter;
    if $d_i$ is in the range of $\mu \pm \gamma \sigma$, then determining data corresponding to the one point cloud as the target point cloud data.

15. The method according to claim 6, wherein the step of identifying target point cloud data from the three-dimensional point cloud data according to the color difference threshold segmentation method comprises:
    identifying foreground point cloud data from the three-dimensional point cloud data according to the color difference threshold segmentation method;
    calculating $$d_i = \sum_{j=1}^{k} \frac{1}{k} \sqrt{(x_i - x_j)^2 + (y_i - y_j)^2 + (z_i - z_j)^2}$$

for one point cloud of all the point clouds in the foreground point cloud data, $d_i$ is an average distance between the one point cloud and all neighbor points of the one point cloud, k is a number of the neighbor points of the one point cloud, $(x_i, y_i, z_i)$ are coordinates of the one point cloud, $(x_j, y_j, z_j)$ are coordinates of the neighbor points of the one point cloud;
    detecting whether $d_i$ is in a range of $\mu \pm \gamma \sigma$, wherein $$\mu = \sum_{i=1}^{m} \frac{d_i}{m}, \sigma = \sqrt{\frac{1}{m} \sum_{i=1}^{m} (d_i \cdot \mu)^2},$$

m is a number of point clouds in the foreground point cloud data, $\gamma$ is a parameter;
    if $d_i$ is in the range of $\mu \pm \gamma \sigma$, then determining data corresponding to the one point cloud as the target point cloud data.

16. The method according to claim 11, wherein the step of identifying foreground point cloud data from the three-dimensional point cloud data according to the color difference threshold segmentation method comprises:

calculating $R_s - G_s$ for the one point cloud of all the point clouds in the foreground point cloud data, IR, is red-channel R information of the one point cloud, $G_s$ is green-channel G information of the one point cloud;

if $R_s - G_s > \delta$, then determining data corresponding to the one point cloud as the foreground point cloud data, $\delta$ is a preset threshold.

17. The method according to claim 12, wherein the step of identifying foreground point cloud data from the three-dimensional point cloud data according to the color difference threshold segmentation method comprises:

calculating $R_s - G_s$ for the one point cloud of all the point clouds in the foreground point cloud data, $R_s$ is red-channel R information of the one point cloud, $G^s$, is green-channel G information of the one point cloud;

if $R_s - G_s > \delta$, then determining data corresponding to the one point cloud as the foreground point cloud data, $\delta$ is a preset threshold.

18. The method according to claim 13, wherein the step of identifying foreground point cloud data from the three-dimensional point cloud data according to the color difference threshold segmentation method comprises:

calculating $R_s - G_s$ for the one point cloud of all the point clouds in the foreground point cloud data, $R_s$ is red-channel R information of the one point cloud, $G_s$ is green-channel G information of the one point cloud;

if $R_s - G_s > \delta$, then determining data corresponding to the one point cloud as the foreground point cloud data, $\delta$ is a preset threshold.

19. The method according to claim 14, wherein the step of identifying foreground point cloud data from the three-dimensional point cloud data according to the color difference threshold segmentation method comprises:

calculating $R_s - G_s$ for the one point cloud of all the point clouds in the foreground point cloud data, $R_s$ is red-channel R information of the one point cloud, $G_s$ is green-channel G information of the one point cloud;

if $R_s - G_s > \delta$, then determining data corresponding to the one point cloud as the foreground point cloud data, 6 is a preset threshold.

20. The method according to claim 15, wherein the step of identifying foreground point cloud data from the three-dimensional point cloud data according to the color difference threshold segmentation method comprises:

calculating $R_s - G_s$ for the one point cloud of all the point clouds in the foreground point cloud data, $R_s$ is red-channel R information of the one point cloud, $G_s$ is green-channel G information of the one point cloud;

if $R_s - G_s > \delta$, then determining data corresponding to the one point cloud as the foreground point cloud data, $\delta$ is a preset threshold.

* * * * *